(12) United States Patent
Taraboletti et al.

(10) Patent No.: US 6,732,544 B1
(45) Date of Patent: May 11, 2004

(54) FEED AIR PRECOOLING AND SCRUBBING SYSTEM FOR CRYOGENIC AIR SEPARATION PLANT

(75) Inventors: Andrew E. Taraboletti, Williamsville, NY (US); David R. Parsnick, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/438,052

(22) Filed: May 15, 2003

(51) Int. Cl.[7] ................................................. F25J 3/00
(52) U.S. Cl. ........................................... 62/642; 62/644
(58) Field of Search ........................... 62/642, 644, 643, 62/646

(56) References Cited

U.S. PATENT DOCUMENTS

| | | | | |
|---|---|---|---|---|
| 5,282,726 A | | 2/1994 | Warren | 417/243 |
| 5,306,331 A | * | 4/1994 | Auvil et al. | 95/42 |
| 5,321,953 A | * | 6/1994 | Olson, Jr. | 62/650 |
| 5,379,598 A | * | 1/1995 | Mostello | 62/646 |
| 5,456,083 A | * | 10/1995 | Hogg et al. | 62/646 |
| 5,802,872 A | | 9/1998 | Billingham et al. | 62/641 |
| 6,237,366 B1 | | 5/2001 | Arman et al. | 62/643 |
| 6,295,836 B1 | | 10/2001 | Nguyen et al. | 62/643 |
| 6,402,809 B1 | * | 6/2002 | Monereau et al. | 95/14 |
| 2002/0046767 A1 | * | 4/2002 | Gourdain et al. | 137/1 |

* cited by examiner

Primary Examiner—William C. Doerrler
(74) Attorney, Agent, or Firm—Stanley Ktorides

(57) ABSTRACT

A system for preparing feed air for processing in a cryogenic air separation plant wherein nitrogen vapor from the plant is interacted with water to cool the water by heat exchange and also by evaporative cooling to produce chilled water, and the chilled water is contacted with the feed air to cool the feed air and to scrub particulate matter out from the feed air.

9 Claims, 2 Drawing Sheets

US 6,732,544 B1

FEED AIR PRECOOLING AND SCRUBBING SYSTEM FOR CRYOGENIC AIR SEPARATION PLANT

TECHNICAL FIELD

This invention relates generally to cryogenic air separation and, more particularly, to the preparation of feed air for the cryogenic air separation.

BACKGROUND ART

In the cryogenic separation of air using one or more distillation columns to produce one or more products such as nitrogen, oxygen and argon, the feed air is compressed, cleaned of high boiling impurities, and cooled prior to passage into the column or columns of the plant. The operation of the feed air compressor or compressors consumes a significant amount of power, and any improvement which can serve to reduce the compressor power consumption associated with the operation of a cryogenic air separation plant would be very desirable.

Accordingly it is an object of this invention to provide a feed air preparation system which can serve to decrease the compressor power consumption associated with the operation of a cryogenic air separation plant.

SUMMARY OF THE INVENTION

The above and other objects, which will become apparent to those skilled in the art upon a reading of this disclosure, are attained by the present invention, one aspect of which is:

A method for precooling and scrubbing feed air for a cryogenic air separation plant comprising:

(A) passing nitrogen vapor taken from a cryogenic air separation plant to a feed air precooler/scrubber and warming the nitrogen vapor within the feed air precooler/scrubber by heat exchange with water to produce chilled water;

(B) directly contacting the chilled water with feed air containing particulate matter to cool the feed air and to scrub particulate matter from the feed air; and (C) passing the cooled and scrubbed feed air out from the feed air precooler/scrubber for passage on to the cryogenic air separation plant.

Another aspect of the invention is:

A feed air precooler/scrubber comprising:

(A) an evaporative cooling section, means for providing nitrogen vapor from a cryogenic air separation plant to the evaporative cooling section, and means for passing water to the evaporative cooling section;

(B) a chilling and scrubbing section, means for passing water from the evaporative cooling section to the chilling and scrubbing section, and means for passing feed air into the chilling and scrubbing section; and (C) means for withdrawing feed air from the chilling and scrubbing section for passage on to the cryogenic air separation plant.

As used herein the terms "precooling" and "precooler" mean respectively method and apparatus for cooling feed air prior to the passage of the feed air to the main or primary heat exchanger of a cryogenic air separation plant.

As used herein the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process.*

The term "double column" is used to mean a higher pressure column having its upper portion in heat exchange relation with the lower portion of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile component(s) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein the term "indirect heat exchange" means the bringing of two fluids into heat exchange relation without any physical contact or intermixing of the fluids with each other.

As used herein the term "nitrogen vapor" means a gas having a nitrogen concentration of at least 78 mole percent.

As used herein the term "feed air" means a mixture comprising primarily oxygen and nitrogen, such as ambient air.

As used herein the terms "upper portion" and "lower portion" mean those sections of a column respectively above and below the mid point of the column.

As used herein the term "direct heat exchange" means the transfer of heat through contact of cooling and heating entities.

DETAILED DESCRIPTION

In general the invention comprises the use of nitrogen vapor from a cryogenic air separation plant in a manner which cools feed air and scrubs particulates from feed air. This cooling increases the density and reduces the volume of the feed air to a greater degree than conventional systems because the refrigeration is not limited by the ambient wet bulb condition, thus reducing the volume of feed air handled by the compressor(s) and reducing the power consumption of the compressor(s). The removal of particulate matter from the feed air further enhances the operating efficiency of the compressor(s) thus adding to the decrease in the power consumption of the compressor(s).

The invention will be described in detail with reference to the Drawings. The operation of the cryogenic air separation plant illustrated in FIG. 1 will now be described.

Figure 1:
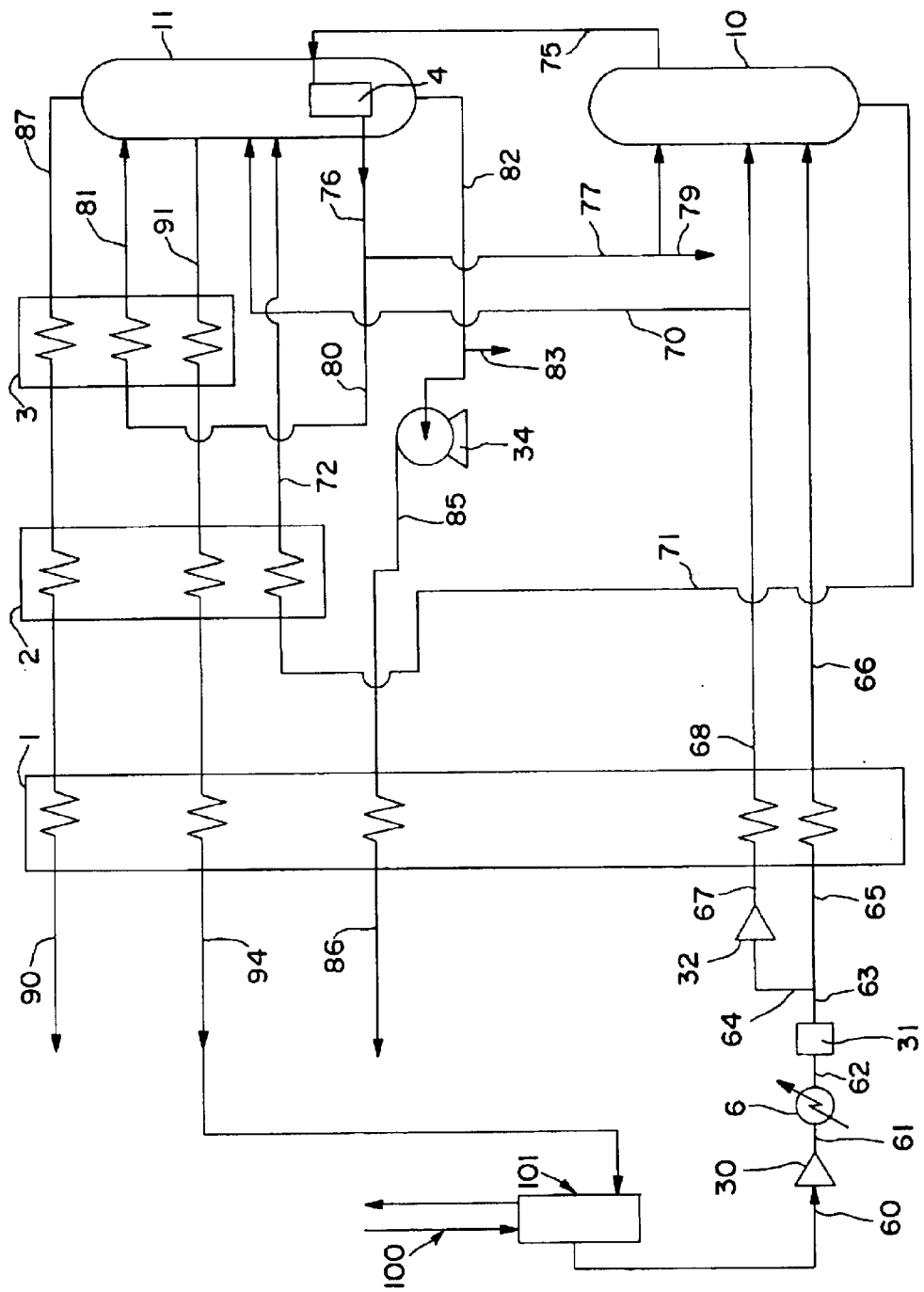
FIG. 1 is a schematic representation of one embodiment of a cryogenic air separation plant which may be used in conjunction with the invention. Any cryogenic air separation plant may benefit from the use of the invention.
Figure 2:
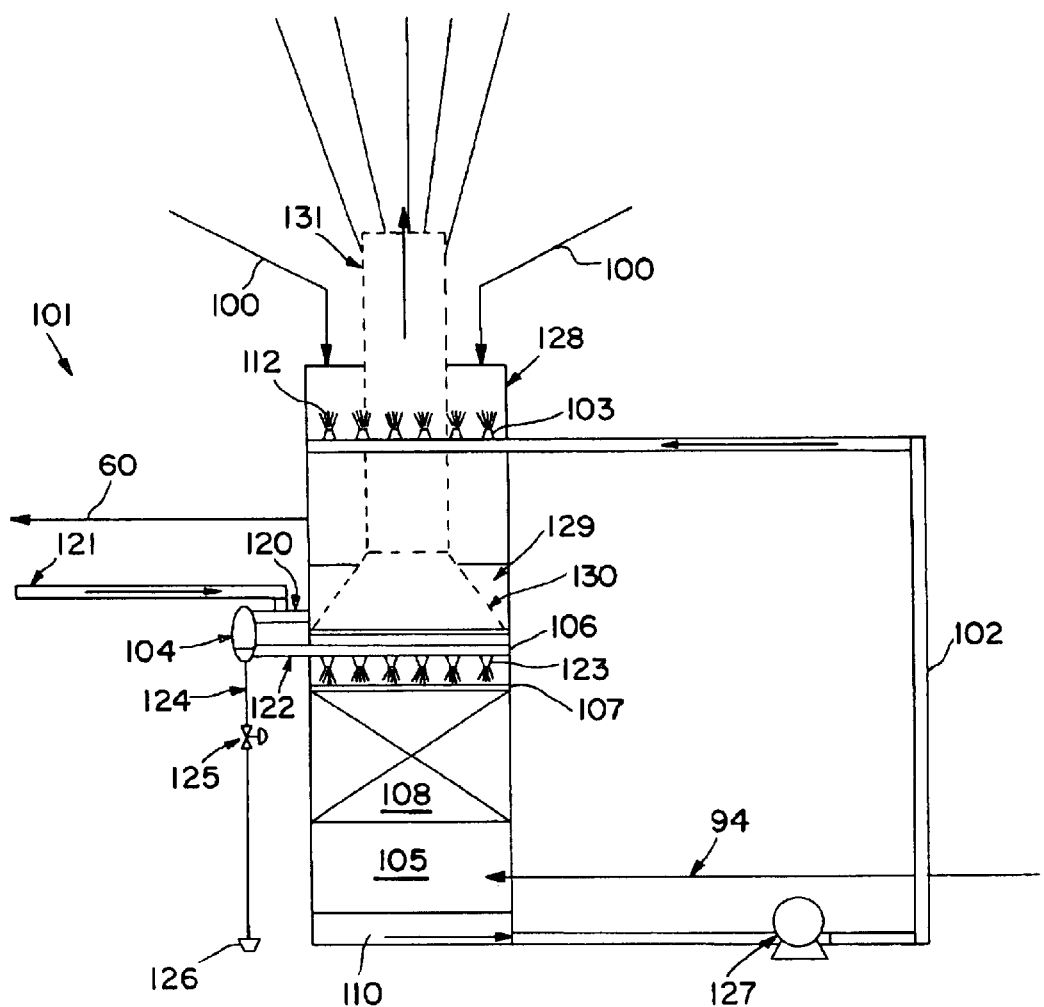
FIG. 2 is a simplified cross-sectional representation of one preferred embodiment of the feed air precooling and scrubbing system of the invention.

Referring now to FIG. 1, feed air 100 is cooled and scrubbed in feed air precooler/scrubber 101, as will be described more fully with reference to FIG. 2 below, and emerges from feed air precooler/scrubber 101 as feed air stream 60. Feed air 60 is compressed by passage through base load compressor 30 to a pressure generally within the range of from 60 to 200 pounds per square inch absolute (psia). Resulting compressed feed air 61 is cooled of the heat of compression in aftercooler 6 and resulting feed air stream 62 is then cleaned of high boiling impurities such as water vapor, carbon dioxide and hydrocarbons by passage through purifier 31. Purified feed air stream 63 is divided into streams 64 and 65. Stream 64 is increased in pressure by passage through booster compressor 32 to a pressure generally within the range of from 100 to 1000 psia to form boosted feed air stream 67. Feed air streams 65 and 67 are cooled by passage through main heat exchanger 1 by indirect heat exchange with return streams and then passed as streams 66 and 68 respectively into higher pressure column 10 which is operating at a pressure generally within the range of from 60 to 200 psia. A portion 70 of stream 68 may also be passed into lower pressure column 11.

Within higher pressure column 10 the feed air is separated by cryogenic rectification into nitrogenen-riched fluid and oxygen-enriched fluid. Nitrogenen-riched fluid is withdrawn as vapor from the upper portion of higher pressure column 10 in stream 75 and condensed in main condenser 4 by indirect heat exchange with boiling lower pressure column bottom liquid. Resulting nitrogen-enriched liquid 76 is returned to column 10 as reflux as shown by stream 77. A portion 80 of the nitrogen-enriched liquid 76 is passed from column 10 to subcooler 3 wherein it is subcooled to form subcooled stream 81 which is passed into the upper portion of column 11 as reflux. If desired, a portion 79 of stream 77 may be recovered as product liquid nitrogen. Also, if desired, a portion (not shown) of nitrogen-enriched vapor stream 75 may be recovered as product high pressure nitrogen gas.

Oxygen-enriched fluid is withdrawn as liquid from the lower portion of higher pressure column 10 in stream 71 and passed to subcooler 2 wherein it is subcooled. Resulting subcooled oxygen-enriched liquid 72 is then passed into lower pressure column 11.

Lower pressure column 11 is operating at a pressure less than that of higher pressure column 10 and generally within the range of from 15 to 150 psia. Within lower pressure column 11 the various feeds into that column are separated by cryogenic rectification into nitrogen-rich vapor and oxygen-rich liquid. Nitrogen-rich vapor is withdrawn from the upper portion of column 11 in stream 87, warmed by passage through heat exchangers 3, 2 and 1, and recovered as product gaseous nitrogen in stream 90 having a nitrogen concentration of at least 99 mole percent, preferably at least 99.9 mole percent, and most preferably at least 99.999 mole percent. For product purity control purposes a waste stream 91 is withdrawn from column 11 from a level below the withdrawal point of stream 87, warmed by passage through heat exchangers 3, 2 and 1, and as stream 94 is passed to feed air precooler/scrubber 101 for further processing as will be described more fully below.

Oxygen-rich liquid is withdrawn from the lower portion of lower pressure column 11 in stream 82. If desired, a portion 83 of stream 82 may be recovered as product liquid oxygen having an oxygen concentration generally within the range of from 90 to 99.9 mole percent. Stream 82 is then passed to liquid pump 34 wherein it is pumped to an elevated pressure generally within the range of from 35 to 500 psia. Resulting elevated pressure oxygen-rich liquid 85 is vaporized and then recovered as elevated pressure gaseous oxygen product 86. In the embodiment illustrated in FIG. 1, the vaporization of the elevated pressure oxygen-rich liquid is shown as occurring within main heat exchanger 1. This vaporization can also occur within a separate heat exchanger such as a standalone product boiler. Refrigeration for the operation of the plant is generally provided by the turboexpansion of a process stream, e.g. a feed air stream. Such turboexpansion is not shown in the drawings.

The feed air precooling and scrubbing system of this invention will be described in greater detail with reference to the embodiment of the invention illustrated in FIG. 2. The numerals in FIG. 2 correspond to those of FIG. 1 for the common elements. Referring now to FIG. 2, nitrogen vapor 94 from the cryogenic air separation plant is passed into the evaporative cooling section of feed air precooler/scrubber 101. The evaporative cooling section comprises access volume 105, sump 110 and packing section 108. The packing section 108 may comprise either structured or random packing.

Water is passed into the evaporative cooling section to be chilled by interaction with the nitrogen vapor. The water is provided from the chilling and scrubbing section through conduit 120 and additional or make up water may be provided through conduit 121. The water is passed to water filter 104 wherein particulate matter is filtered out of the water. The filtered water is passed in conduit 122 to sparger 106 which distributes the water to a plurality of nozzles 123. The filtered water is then sprayed through the nozzles onto liquid distributor tray 107 and then passes from liquid distributor tray 107 into packing section 108. Dirty, i.e. particulate laden, water is withdrawn from filter 104 in conduit 124, passed through valve 125 and removed from the system such as by introduction into drain 126.

Because the nitrogen vapor from the cryogenic air separation plant is very dry, i.e. has essentially no moisture, some of the water is driven to evaporate thereby cooling or chilling the remaining liquid water by evaporative cooling. Generally the nitrogen vapor has a dew point of less than 100° F. Additionally, as the water passes down through packing section 108 countercurrently to upflowing nitrogen vapor, the nitrogen vapor is warmed by indirect and/or direct heat exchange with the downflowing water thereby serving to further cool or chill the water.

The resulting cooled water passes from packing section 108 through access volume 105 and collects in sump 110. The evaporative cooling of the water continues as it drips through access volume 105 and sits in sump 110.

Chilled water from the sump 110 of the evaporative cooling section is pumped by operation of pump 127 through conduit 102 to chilling and scrubbing section 128.

Feed air 100 is also provided to chilling and scrubbing section 128. The chilled water from conduit 102 is passed to a plurality of spray nozzles 103 and out from the spray nozzles 103 to form chilled water spray 112. The chilled water in the form of chilled water spray 112 directly contacts feed air 100 and by this action cools the feed air by direct heat exchange and also scrubs particulate matter out from feed air 100. The cooled and scrubbed feed air is withdrawn from chilling and scrubbing section 128 in stream 60 for further processing prior to passage on to the cryogenic air separation plant. The warmed and particulate laden water settles in the lower,part of chilling and scrubbing section 128 as depicted in FIG. 2 by water pool 129, and is then passed out of chilling and scrubbing section 128 in conduit 120 for further processing as was previously described. Nitrogen vapor, after passage through packing section 108, is collected by hood collector 130 which communicates with vent conduit 131. The nitrogen vapor is passed out of the feed air precooler/scrubber 101 through vent conduit 131 and released to the atmosphere.

Although the invention has been described in detail with reference to a certain preferred embodiment, those skilled in the art will recognize that there are other embodiments of the invention within the spirit and the scope of the claims. For example, the nitrogen vapor for use in the feed air precooler/scrubber may come from other than the waste nitrogen stream.

What is claimed is:

1. A method for precooling and scrubbing feed air for a cryogenic air separation plant comprising:
    A) passing nitrogen vapor taken from a cryogenic air separation plant to a feed air precooler/scrubber and warming the nitrogen vapor within the feed air precooler/scrubber by heat exchange with water to produce chilled water;
    B) directly contacting the chilled water with feed air containing particulate matter to cool the feed air and to scrub particulate matter from the feed air; and
    C) passing the cooled and scrubbed feed air out from the feed air precooler/scrubber to a compressor for passage on to the cryogenic air separation plant.

2. The method of claim 1 wherein the nitrogen vapor has a dew point of less than 100° F.

3. The method of claim 1 wherein after the chilled water directly contacts the feed air, it is filtered to remove particulate matter and then is brought into interaction with nitrogen vapor for the production of chilled water.

4. A feed air precooler/scrubber comprising:
    (A) an evaporative cooling section, means for providing nitrogen vapor from a cryogenic air separation plant to the evaporative cooling section, and means for passing water to the evaporative cooling section;
    (B) a chilling and scrubbing section, means for passing water from the evaporative cooling section to the chilling and scrubbing section, and means for passing feed air into the chilling and scrubbing section; and
    (C) means for withdrawing feed air from the chilling and scrubbing section which communicates with a compressor for passage on to the cryogenic air separation plant.

5. The feed air precooler/scrubber of claim 4 wherein the evaporative cooling section comprises an access volume, a packing section and a sump, and the means for providing nitrogen vapor to the evaporative cooling section communicates with the access volume.

6. The feed air precooler/scrubber of claim 4 wherein the means for passing water from the evaporative cooling section to the chilling and scrubbing section includes conduit means from the evaporative cooling section communicating with a plurality of spray nozzles.

7. The feed air precooler/scrubber of claim 4 wherein the means for passing water to the evaporative cooling section includes a plurality of spray nozzles and a liquid distributor tray.

8. The feed air precooler/scrubber of claim 4 wherein the means for passing water to the evaporative cooling section further comprises means for withdrawing water from the chilling and scrubbing section.

9. The feed air precooler/scrubber of claim 4 wherein the means for passing water to the evaporative cooling section includes a filter for receiving water from the chilling and scrubbing section.

\* \* \* \* \*